July 12, 1960     H. G. MAYHEW     2,945,099
STEERING WHEEL SWITCH MECHANISM FOR AWAKENER ALARM
Filed Feb. 17, 1959     2 Sheets-Sheet 1

INVENTOR.
Henry G. Mayhew
BY
ATTORNEY.

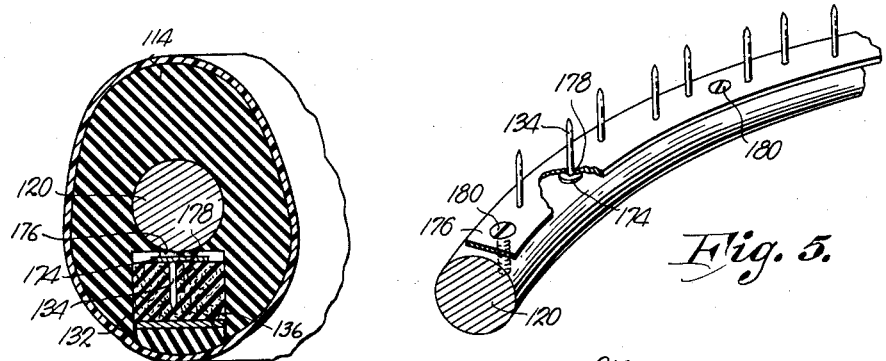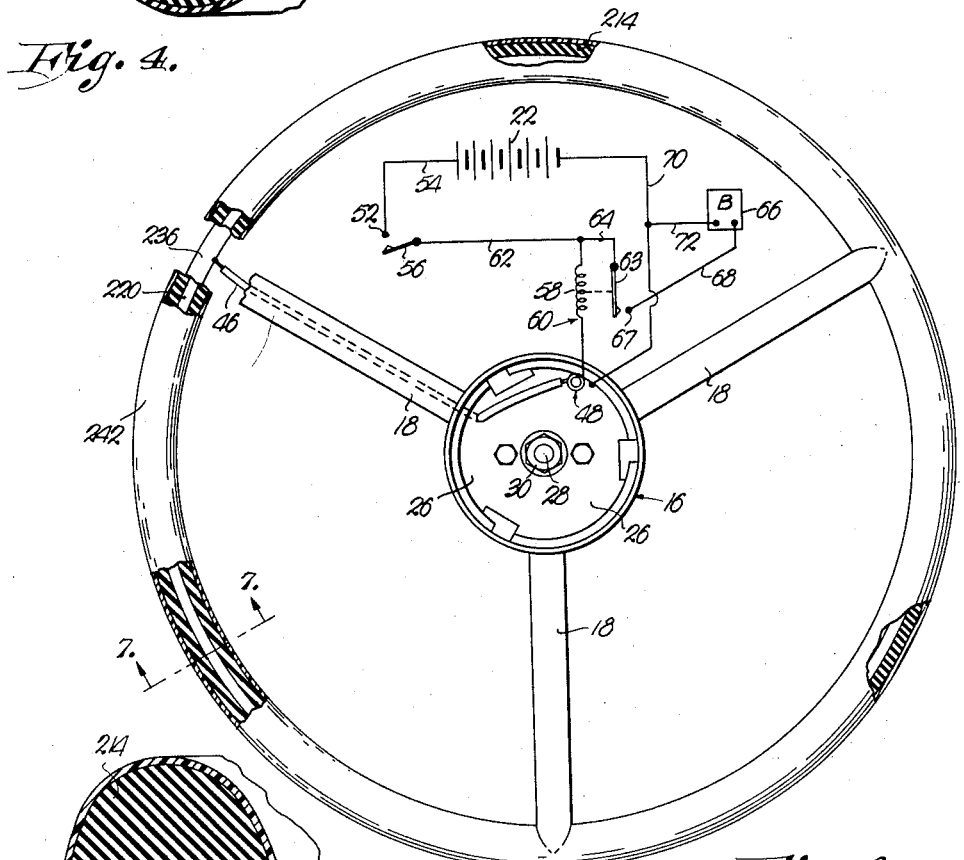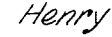

United States Patent Office 2,945,099
Patented July 12, 1960

2,945,099

STEERING WHEEL SWITCH MECHANISM FOR AWAKENER ALARM

Henry G. Mayhew, 2906 Indiana, Topeka, Kans.

Filed Feb. 17, 1959, Ser. No. 793,787

10 Claims. (Cl. 200—61.57)

This invention relates to accessory equipment for vehicles and particularly to an improved steering wheel switch mechanism for controlling an alarm to wake or help prevent a driver from falling asleep at the wheel of the vehicle.

Previous alarm systems have been provided for causing a buzzer or bell to sound when the driver's head nodded or his grip was relaxed on the steering wheel, but these prior systems have not been entirely satisfactory principally because of the failure to supply a workable switch mechanism controlling actuation of the awakener alarm.

It is therefore the primary object of this invention to provide an improved switch mechanism for controlling an awakener alarm to wake or prevent a driver from falling asleep and which is incorporated into the conventional steering wheel so that whenever the driver's hands relax to a sufficient extent or are completely removed from the wheel, the switch is permitted to move to a position causing the awakener alarm to be actuated.

It is a further important object of the invention to provide a novel switch mechanism for vehicle awakener alarm systems wherein the pressure of the driver's fingers gripping the rim member of the steering wheel maintains the switch components thereof in an open position and thereby inactivating the awakener alarm, but causing the same to be actuated whenever the driver's fingers relax around the wheel or the driver releases the rim member thereof.

An additional important aim of the invention is to provide a switch mechanism utilizing the central metallic core of the conventional steering wheel as a part of the switch and thereby lessening the cost of the assembly as well as the modification of the wheel required to incorporate the awakener alarm switch mechanism therein.

A still further important aim of the invention is to provide an improved steering wheel switch mechanism for an alarm system wherein is included a movable, annular contact band extending around the entire periphery of the rim member of the steering wheel and which is adapted to be moved into engagement with a contact element electrically connected to the alarm whereby the latter remains inactivated so long as the driver grips the rim member at any point around the circumference thereof and during driving of the vehicle.

Other important objects will become apparent as the following specification progresses, such as the way in which the switch mechanism may be constructed of relatively inexpensive materials readily available on the open market and which, when assembled in place on the steering wheel, do not in any way detract from the appearance thereof.

In the drawings:

Fig. 4 is an enlarged, vertical, fragmentary, cross-sectional view similar to Fig. 2 and showing a modified form of the present invention;

Fig. 5 is an enlarged, fragmentary, perspective view of the steering wheel core, contact pins and hold-down part associated therewith and as illustrated in Fig. 4;

Fig. 6 is a plan view of a steering wheel showing another modified switch mechanism with portions of the wheel broken away and in section and the wiring components of the switch being illustrated schematically; and Fig. 7 is an enlarged, fragmentary, vertical, cross-sectional view taken substantially on the line 7—7 of Fig. 6.

Figures 1, 2, 3:
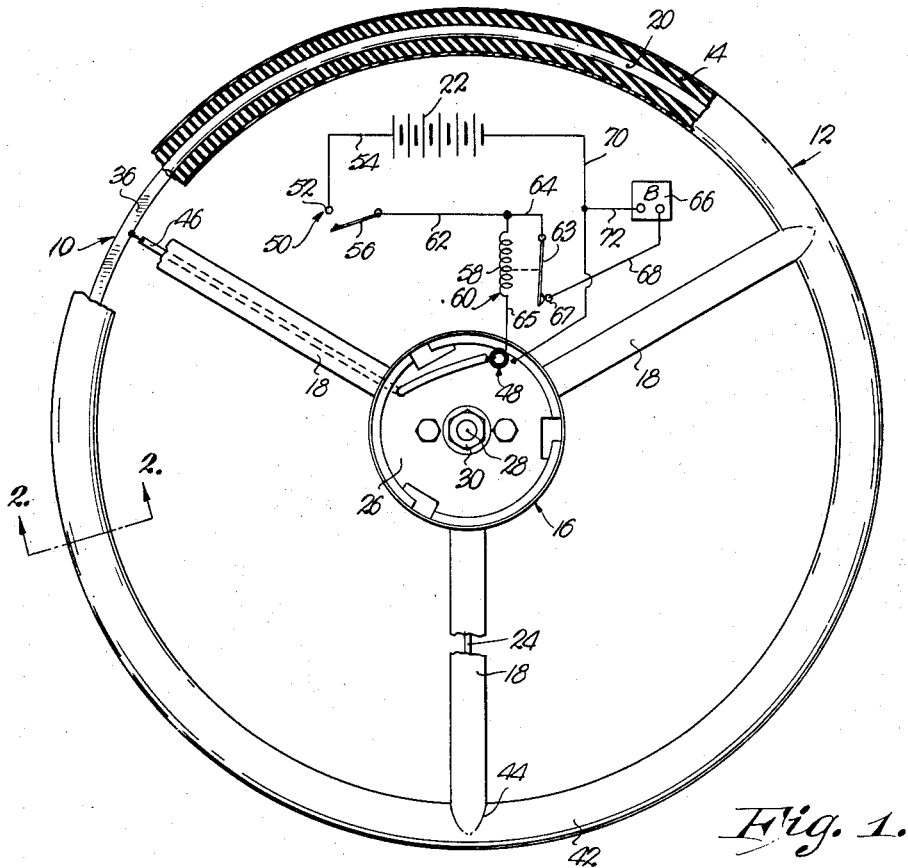
Figure 1 is a plan view of a steering wheel having one type of switch mechanism thereon embodying the concepts of the present invention with certain portions of the steering wheel being broken away and in section to reveal details thereof, and the wiring components of the mechanism being shown schematically.
Fig. 2 is an enlarged, fragmentary, vertical, cross-sectional view taken substantially on the line 2—2 of Fig. 1.
Fig. 3 is an enlarged, fragmentary, central, longitudinal view of the structure illustrated in Fig. 2.

Switch mechanism broadly numerated 10 and comprising the preferred form of the present invention is illustrated in its normal position on a slightly modified, conventional steering wheel 12 comprising a part of a vehicle such as an automobile or truck. Steering wheel 12 has an annular, generally transversely circular rim member 14 and a central hub 16 connected to rim member 14 by three spokes 18 disposed in radially extending relationship and equidistant around the axis of hub 16. The conventionally provided annular, reinforcing metallic ring element 20 embedded within rim member 14 in concentric relationship thereto comprises a part of the present switch mechanism and is thereby grounded to the chassis of the vehicle and the negative pole of battery 22 by virtue of metal spoke reinforcing rods 24 welded to annular element 20, extending through respective spokes 18 and contacting the central metal plate 26 of hub 16. It is to be understood that plate 26 is secured to the steering shaft 28 of the vehicle by suitable nut means 30 and therefore, plate 26, rods 24 and element 20 are grounded to the negative terminal of battery 22.

Rim member 14 is provided with an annular, circumferentially extending, transversely rectangular groove 32 in the normally rearmost face thereof and extending inwardly and into communication with element 20 as best shown in Fig. 2. A series of contact pins 34 are embedded or otherwise secured to element 20 in offset, longitudinally spaced relationship around the periphery of rim member 14 and extending outwardly from element 20 within groove 32, as best shown in Fig. 2. It is to be noted that contact pins 34 are pointed on the outermost ends thereof and terminate in spaced relationship to the outer opening of groove 32 in rim member 14.

An annular band 36 of flexible metallic, conductive material is positioned within groove 32 in coaxial relationship thereto and movable toward and away from the outer ends of contact pins 34. An annular layer 38 of relatively soft foam rubber material is interposed between element 20 and band 36 within groove 32 and normally maintains the innermost face of band 36 out of contacting relationship with contact pins 34. Another annular strip 40 of resilient material is secured to the outermost face of band 36 in complemental relationship and extends outwardly from groove 32. It is to be preferred that the material comprising strip 40 be of greater rigidity than the foam rubber material presenting layer 38 whereby, when the driver grips rim member 14 of steering wheel 12, the proximal area of band 36 is moved into engagement with respective contact pins 34 by virtue of sponge material 38 giving to a greater extent than the resilient material 40 defining the strip overlying band 36.

An annular sleeve 42 of resilient woven material is disposed in surrounding relationship to rim member 14 and extending around the entire circumference thereof as shown in Fig. 1. It is, however, to be noted that sleeve 42 is provided with circular cutouts 44 disposed to clear each of the spokes 18. The transverse dimension of sleeve 42 is chosen so that the same maintains band 36 within the outer part of groove 32, yet is not of sufficient resiliency to force the innermost face of band 36 into contacting relationship with pins 34.

The wiring diagram for switch mechanism 10 and as illustrated in Fig. 1, includes a wire 46 connected to band 36 and extending along one of the spokes 18 for passage through plate 26 and electrically connected to a brush and cap assembly 48 carried by hub 16. Switch 50 preferably mounted on the dashboard of the vehicle, has a contact 52 connected to the positive terminal of battery 22 by a lead 54, while the manually manipulable on-off switch arm 56 is coupled to the coil 58 of a relay 60 by lead line 62 and to the relay arm 63 normally engaging contact 67, by a line 64. Electrical buzzer 66, also mounted on the dashboard adjacent the driver, is connected to contact 67 by a lead 68 and to ground line 70 by lead 72. It is to be understood that ground line 70 schematically represents the way in which plate 26 and thereby element 20 is grounded to the negative terminal of battery 22. Line 65 electrically interconnects coil 58 and brush and cap assembly 48.

Although not specifically illustrated, it is also to be understood that buzzer 66 may be wired to suitable mechanism connected to the speedometer structure of the vehicle, whereby buzzer 66 is rendered inactive except when the speedometer of the vehicle registers in excess of thirty miles per hour.

In operation, and when the driver desires to activate the alarm mechanism, he closes switch 50 by swinging arm 56 into contacting relationship with contact 52. Thus, when the driver grips rim member 14 of steering wheel 12 in order to steer the vehicle, the areas of conductive band 36 adjacent the driver's fingers are shifted into contacting relationship with pins 34 whereby current is permitted to pass along a path traced by lead 54, contact 52, arm 56, lead 62, coil 58, line 65, brush and cap assembly 48, band 36, contact pins 34, element 20, rods 24, plate 26, steering shaft 28 and ground line 70. Upon energization of coil 58, relay arm 63 is swung out of contacting relationship with contact 67 and therefore, current is not permitted to pass to buzzer 66.

However, if the driver's hands should relax around rim member 14 as when the driver dozes or falls asleep, band 36 moves out of engagement with pins 34, thereby breaking the circuit to coil 58 and permitting relay arm 63 to move into engagement with contact 67 and thereby energizing buzzer 66 through a circuit traced by lead 54, contact 52, arm 56, lead 62, line 64, arm 63, contact 67, lead 68, buzzer 66, lead 72 and ground line 70.

One of the features of the present construction is the fact that the driver is always assured that the buzzer is in working order by virtue of the fact that the same immediately buzzes when switch 50 is closed and ceases upon the driver grasping the wheel and thereby energizing coil 58. It is further to be appreciated that the resilient materials from which layer 38 and strip 40 are constructed are correlated so that normal hand pressure on steering wheel 12 maintains band 36 in contacting relationship with pins 34. Of significance is the fact that switch mechanism 10 is maintained closed during normal driving of the vehicle by virtue of the fact that the switch extends around the entire periphery of rim member 14 and therefore, the driver always keeps the switch in a closed condition unless he falls asleep or dozes at the wheel.

In the modified construction illustrated in Figs. 4 and 5, the elements are identical with those previously described with the exception of the contact pins 134 each having a relatively disc-shaped head portion 174 thereon and which abut core element 120. An annular hold-down part 176 comprising a strip of metal overlies the head portions 174 of contact pins 134 and is provided with a series of openings 178 clearing each of the outwardly extending ends of pins 134. Screws 180 extending through hold-down part 176 and into element 120 serve to releasably secure contact pins 134 in correct positions extending outwardly within the groove 132 in rim member 114. It can be recognized that this construction more readily permits modification of presently existing steering wheels and furthermore, may be less expensive in production of the overall assembly. An additional alternative arrangement (not shown) comprises a second annular hold-down part concentric with part 176 and disposed in engagement with the outer faces of head portions 174, with suitable rivet means being provided for interconnecting the opposed head portions 174.

The operation of the modification illustrated in Figs. 4 and 5 is identical with that previously described with respect to the construction of Figs. 1 to 3 inclusive.

A third modified form of the present invention is best shown in Figs. 6 and 7 and is identical with the mechanism set forth above, with the exception that groove 232 in rim member 214 is somewhat narrower than groove 32 in rim member 14, and the annular conductive band 236 is disposed externally of groove 232. In this instance, a plurality of non-conductive tubular members 282 (three being sufficient) are suitably secured to the innermost face of band 236 and complementally receive respective contact pins 234, as best shown in Fig. 7, to prevent rotative movement of band 236 relative to core element 220 embedded within rim member 214. Contact pins 234 may either be embedded in contact element 220 or may be removably secured thereto in the manner indicated and best shown in Figs. 4 and 5. The resilient sleeve 242 serves to maintain band 236 in a position with the tubular members 282 receiving respective contact pins 234, while the layer 238 of sponge material biases band 236 away from contacting engagement with the outermost ends of contact pins 234.

The operation of the switch mechanism of Figs. 6 and 7 is identical with that of Figs. 1 to 3 inclusive and therefore, the same numbers where appropriate have been applied to the drawings.

Although the preferred form of the invention as well as modifications thereof have been illustrated in detail, it is to be understood that additional changes may be made without departing from the spirit of the invention and it is therefore intended to be limited only by the scope of the appended claims.

Having thus described the invention what is claimed as new and desired to be secured by Letters Patent is:

1. Steering wheel switch mechanism for controlling an awakener alarm system for a vehicle and including a signal device electrically coupled with a source for energizing the same upon opening of the switch of said mechanism, said switch including in combination with the steering wheel of the vehicle an annular conductor on the rim member of the steering wheel; a plurality of spaced contact pins secured to said element and extending outwardly therefrom; means electrically coupling the element to the device; structure carried by the rim member, substantially coextensive in length with the element and normally maintained in spaced relationship to said pins prior to gripping of the wheel by the driver, individual areas of the structure being movable into electrically contacting relationship to the pins in response to the driver's gripping the portions of the rim member of the steering wheel adjacent thereto, said rim member having an annular groove therein permitting said structure to move into electrically contacting relationship to said pins, there being means within the groove and interposed between the element and said structure for biasing the latter away from said pins; and means electrically connecting the structure to said source whereby the device is energized when the driver's grip on said wheel relaxes sufficiently to permit all areas of the structure to move out of electrically contacting relationship to the pins.

2. Steering wheel switch mechanism as set forth in claim 1 wherein said structure includes a flexible annular metallic band substantially concentric with the element and disposed in a position whereby areas thereof may be moved into engagement with certain of the outer ends of the contact pins when the driver grips the steering wheel.

3. Steering wheel switch mechanism as set forth in claim 1 wherein said contact pins are disposed in staggered relationship longitudinally of the element.

4. Steering wheel switch mechanism as set forth in claim 1 wherein said contact pins are integral with said element.

5. Steering wheel switch mechanism as set forth in claim 1 wherein each of said contact pins includes a transversely extending head portion on the end thereof proximal to said element, the head portions of respective contact pins being disposed in abutting relationship to the element and there being means connected to the element and engaging said head portions of the contact pins for securing the latter to the element in positions extending outwardly therefrom toward said structure.

6. Steering wheel switch mechanism as set forth in claim 5 wherein the means securing said headed contact pins to the element includes a flexible, annular, hold-down part positioned in said groove, substantially coextensive in length with the element, provided with openings clearing respective contact pins and overlying the head portions of said contact pins, there being screw means extending through the hold-down part and into said element.

7. Steering wheel switch mechanism as set forth in claim 2 wherein is provided an annular strip of resilient material overlying the outer face of the band away from said element.

8. Steering wheel switch mechanism as set forth in claim 7 wherein said resilient material has a higher coefficient of hardness than the means within said groove between the element and the band and biasing the latter away from the element.

9. Steering wheel switch mechanism as set forth in claim 2 wherein is provided an annular sleeve of resilient material surrounding the rim member and said band and coextensive in length therewith.

10. Steering wheel switch mechanism as set forth in claim 2 wherein is provided a series of nonconductive tubular members secured to the underface of the band and facing toward said element, said tubular members reciprocably receiving the outer ends of respective contact pins to limit rotative movement of the band relative to the element.

References Cited in the file of this patent

UNITED STATES PATENTS

| | | |
|---|---|---|
| 1,345,259 | Saurage | June 29, 1920 |
| 2,025,977 | Getty | Dec. 31, 1935 |
| 2,211,131 | Knauber | Aug. 13, 1940 |
| 2,304,546 | Cox | Dec. 8, 1942 |
| 2,892,359 | Overman | June 30, 1959 |

FOREIGN PATENTS

| | | |
|---|---|---|
| 1,110,551 | France | Oct. 12, 1955 |